April 29, 1958     H. M. McCONNELL     2,832,907
DYNAMO-ELECTRIC MACHINE
Filed Dec. 23, 1955     2 Sheets-Sheet 1

INVENTOR.
HOWARD M. McCONNELL
BY
ATTORNEY

United States Patent Office 2,832,907
Patented Apr. 29, 1958

2,832,907

DYNAMO-ELECTRIC MACHINE

Howard M. McConnell, Chagrin Falls, Ohio, assignor to Jack & Heintz, Inc., Cleveland, Ohio, a corporation of Delaware Application December 23, 1955, Serial No. 555,037

3 Claims. (Cl. 310—113)

The present invention relates to dynamo-electric machines of the type having rotating field windings and a rotating exciter armature winding including rotating rectifying elements for energizing the field winding, the voltages in the exciter armature winding being induced therein through transformer action.

In dynamo-electric machines where polyphase rotating exciter windings are connected to the field winding of the machine by rotating rectifiers, the size or output of the machine has heretofore been limited by the current carrying capacity of the individual rectifiers and by the matching problems involved if an attempt is made to increase the current carrying capacity of the rectifying elements by connecting them in parallel. A further problem in attempting to increase the output of the machine, especially where the machine is to be used as an aircraft alternator, is to accomplish the increase in output without increasing the size, particularly the axial length of the alternator.

Therefore, an important object of the present invention is to provide a new and improved machine of the type referred to above, in which, for a given size machine, the current carried by the individual rectifying elements is reduced, making it possible to provide a larger size machine having therein rectifiers of a given current rating and to accomplish this without introducing the problem of matching rectifiers.

Another object of the present invention is to provide a new dynamo-electric machine of the type referred to above wherein the rotating exciter winding includes an interphase transformer connected between polyphase exciter windings, the machine being so constructed and arranged that the inclusion of the interphase transformer as part of the armature does not increase the axial length of the machine.

The preferred embodiment of the present invention accomplishes the above objects by providing a dynamo-electric machine comprising a rotatable shaft having thereon the field winding for the machine and an exciter armature winding for energizing the field winding which exciter winding comprises a three-phase double star connected winding with an interphase transformer, the interphase transformer being positioned in totally enclosed slots in the magnetic structure or core for the exciter armature which enclosed slots are positioned radially inwardly of the slots for the exciter armature winding.

Further objects and advantages will be apparent from the following detailed description of the preferred embodiment of the present invention made with reference to the accompanying drawings forming a part of this specification and in which.

Figure 1:
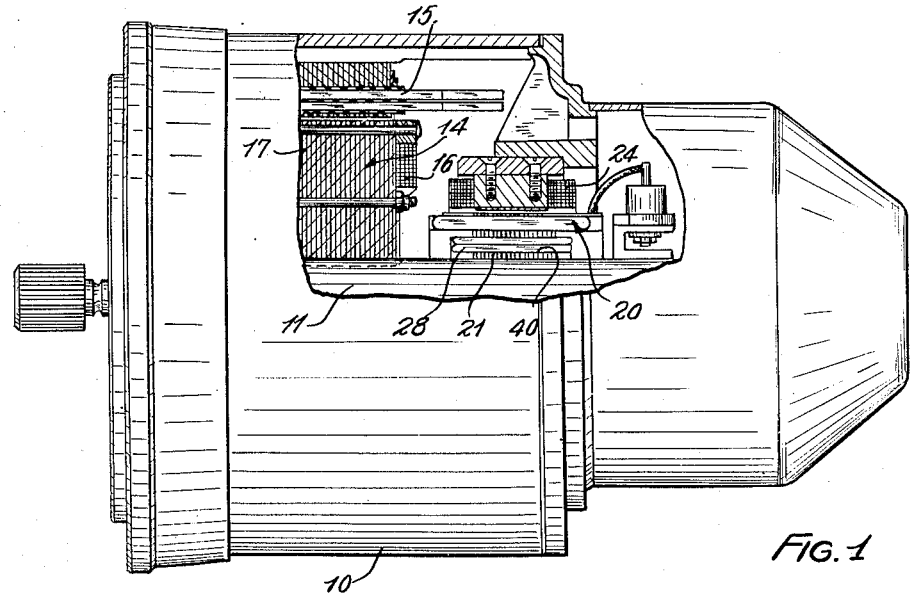
Figure 1 is an elevational view with parts cut away of a dynamo-electric machine embodying the present invention.

Referring to the drawings, the dynamo-electric machine shown therein comprises a casing 10 and a shaft 11 rotatably supported by the end walls of the casing 10. The shaft 11 extends outwardly of one of the end walls, the left end wall as the machine is viewed in Figure 1, and is provided with means for driving the shaft from a source of motive power such as an aircraft engine.

The shaft 11 mounts, inside the casing 10 adjacent to the left hand end thereof, a main field rotor 14 which rotates within a fixed armature winding 15 supported by the internal walls of the casing 10. The field rotor 14 includes a magnetic structure or core and a direct current field winding 16 forming a plurality of salient poles 17. The fixed armature 15 and the field rotor 14 are of conventional construction well known to those skilled in the art and therefore these parts have not been shown or described in detail.

The main field winding 16 is energized from an exciter armature winding 20 wound on a magnetic structure or core 21 fixed to the shaft 11 adjacent to the main field rotor 14 for rotation with the shaft. The core 21 is a cylindrical structure made up of a plurality of laminations 21a and has spaced peripheral axially extending slots 23 for receiving the exciter armature winding. The armature winding 20 is inductively coupled to a stator or primary winding 24 wound on a magnetic structure fixed to the casing 10 so as to provide a plurality of poles. The primary winding 24 may be energized from the stationary armature winding 15 through suitable rectifying and controlling means well known in the art.

The exciter armature winding 20 is a three-phase double star connected winding comprising a star connected three-phase winding 26 and a star connected three-phase winding 27. An interphase transformer 28 is connected between the common junction points 30, 31 of the individual phase windings 26a, 27a of the star connected windings 26, 27 respectively. The interphase transformer 28 has a center tap 33 connected to a terminal 34 which is in turn connected to one side of the main field winding 16. The other side of the main field winding 16 is connected to a terminal 35. The outer end of each of the phase windings 26a, 27a of the three-phase double star connected winding is connected to the terminal 35 through an individual rectifier element 36 which, in the illustrated embodiment, permits current flow from the individual phase windings to the terminal 35. The rectifier elements 36 are mounted on a hexagonal shaped member 37 fixed to the shaft 11 for rotation therewith.

Figure 2:
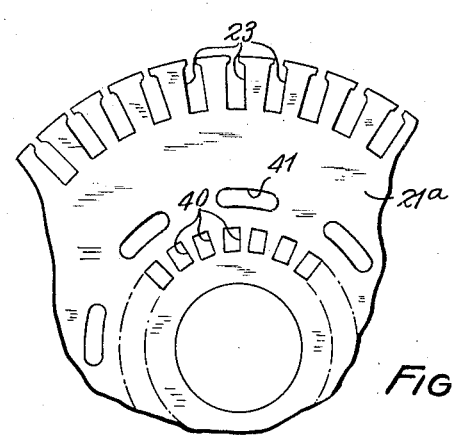
Figure 2 is an enlarged fragmentary elevational view of a lamination used in the exciter rotor of the machine of Figure 1.
Figure 3:
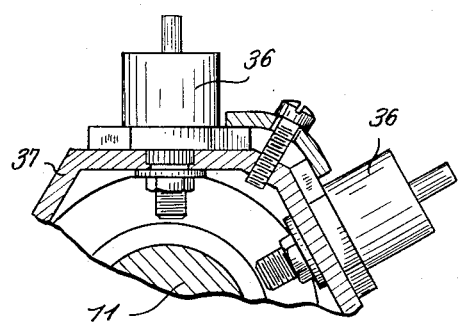
Figure 3 is an enlarged fragmentary cross-sectional view of the rotatable shaft of the machine of Figure 1 showing part of the rotating rectifier.
Figure 4:
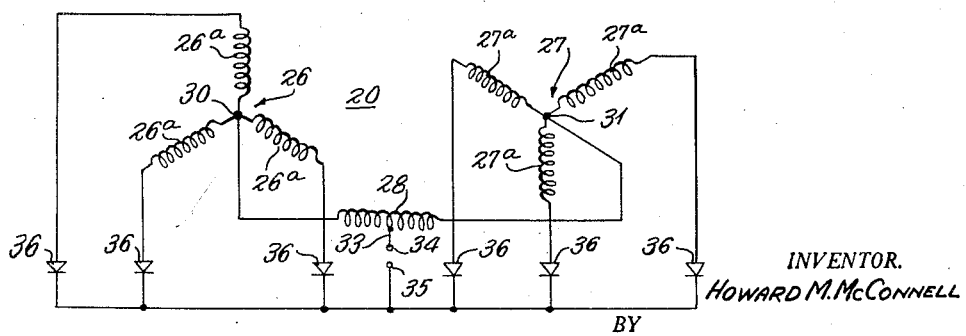
Figure 4 is a circuit diagram of the exciter armature winding and interphase transformer.

One of the laminations 21a making up the core 21 is shown in Figure 2. The three phase double star connected windings 26, 27 are wound in the slots 23, which are spaced about and open into the peripheries of the laminations forming the core 21, in such a manner that the legs or single phase windings 26a of the winding 26 alternate about the periphery of the core with the legs or single phase windings 27a of the star connected winding 27. The relative angular positions of the leg windings 26a, 27a are indicated schematically in Figure 4; as there shown, the windings preferably are 60° out of phase with each other.

The interphase transformer winding 28 is distributed in totally enclosed holes 40 in the magnetic core 21, the holes 40 of one lamination 21a being shown in Figure 2. The distributed interphase winding of the preferred embodiment is shown in detail in Figure 5. The winding is, as mentioned above, a centertapped winding with one half of the winding connected between the junction 30 and the center tap and the other half of the winding connected between the junction 31 and the center tap. The wire forming the half of the winding connected to junction 30 has been designated by the reference character *x* and the wire forming the other half of the winding has been designated by the reference character *y*.

In the illustrated embodiment the core 21 is illustrated as having 24 holes 40 for the distributed interphase winding with each hole having a single pass of wire from each half of the transformer therein. In order that the two halves of the winding 28 be tightly coupled magnetically and at the same time have the low leakage reactance associated with transformers, it is preferable that each hole contain equal numbers of passes of the wires *x*, *y* and no hole contain only the wire *x* or the wire *y*.

Figure 5:
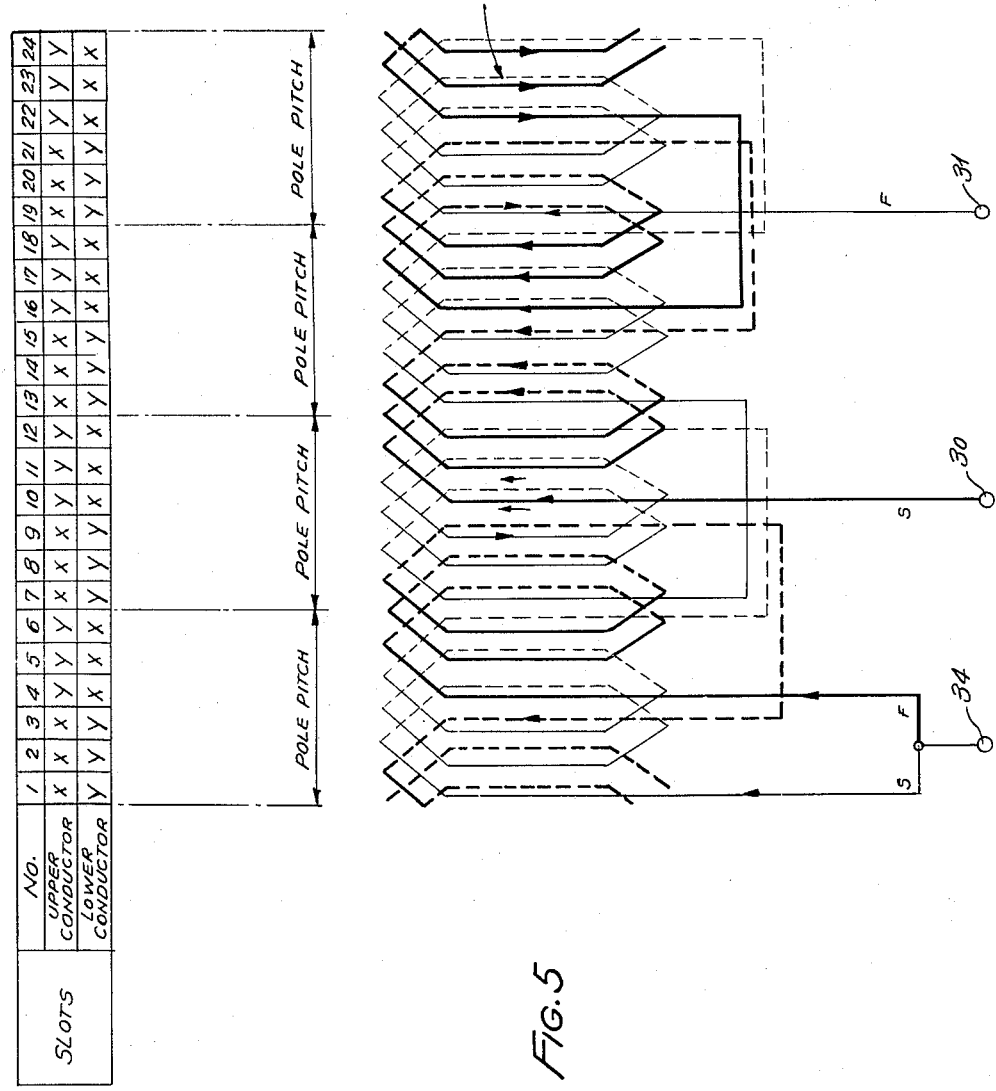
Figure 5 is a schematic diagram showing the winding of the interphase transformer on the core structure.

Figure 5 shows schematically a suitable construction for this winding. The holes 40 have been numbered 1 to 24 and the wire *x* or *y* contained in each hole indicated as well as the relative position of the wire in each hole. The letters S and F indicate the start and finish, respectively, of the windings. The embodiment illustrated resembles a four-pole integral slot, two phase, 50% chorded induction motor winding, it being understood that the winding could be wound so as to include a different number of poles.

It will be noted that the winding is such that the currents in the portions of the wire *x* and the wire *y* in each hole 40 flow in the opposite direction.

Magnetic isolation slots 41 are cut between the interphase transformer holes 40 and the slots 38 for the three phase star connected windings 26, 27 so as to aid in preventing interaction between the windings 26, 27 and the interphase transformer winding.

It will be understood that only one form of interphase winding has been shown and that the invention contemplates the use of other and more complicated interphase windings and that a distributed interphase winding can be used in applications other than that shown.

A double star connected winding with an interphase transformer causes the current to divide equally between each leg of the star connected windings. The current load carried by the individual rectifier elements will be no greater than if a single three phase star connected winding were used with two rectifiers connected in parallel in each leg of the winding. However, if such a single three phase star connected winding is used the rectifier elements in each leg must be matched. In the armature winding of the present invention, no matching of rectifier elements is required.

It can now be seen that the present invention provides a dynamo-electric machine having a rotating field and a rotating exciter winding with a rotating rectifier which is so constructed and arranged that the output of the machine may be increased without increasing the ratings of the individual rectifying elements and without creating a problem of matching rectifying elements. It can also be seen that an interphase transformer forming a part of the exciter armature windings has been incorporated as a part of the rotor without increasing the axial length thereof.

While the preferred embodiment of the present invention has been described in considerable detail, it is hereby my intention to cover all modifications and arrangements which fall within the ability of those skilled in the art to which the invention relates and the scope of the appended claims.

What I claim is:

1. In a brushless alternating current generator having a rotatable shaft, a main field winding on the shaft and a stationary armature winding, an exciter for energizing said main field winding comprising a magnetic core on said shaft having circumferentially spaced slots adjacent the periphery thereof, armature windings comprising two polyphase star-connected windings disposed in said slots, said core having circumferentially spaced, axially extending holes extending therethrough and disposed radially inwardly of said slots, an interphase transformer interconnecting said polyphase star-connected windings, the windings of said interphase transformer being disposed in said holes, and said magnetic core having magnetic isolation slots extending axially thereof between the windings of said interphase transformer and said polyphase star-connected windings, rectifying means mounted on said shaft and comprising a rectifier element connected to the outer end of each of the phase windings of said polyphase star-connected armature windings, said elements being spaced circumferentially around said shaft, and circuit means connecting the output of said rectifier means to said rotating field winding.

2. In a brushless alternating current generator having a rotatable shaft, a main field winding on the shaft, and a stationary armature winding, an exciter for energizing said main field winding comprising a magnetic core on said shaft having circumferentially spaced slots adjacent the periphery thereof, armature windings comprising two polyphase star-connected windings disposed in said slots, said core having circumferentially spaced, axially extending holes extending therethrough and disposed radially inwardly of said slots, an interphase transformer interconnecting said polyphase star-connected windings, the windings of said interphase transformer being disposed in said holes, and said magnetic core having magnetic isolation slots extending axially thereof between the windings of said interphase transformer and said polyphase star-connected windings, rectifying means mounted on said shaft for rectifying the output of said star-connected windings, and circuit means connecting the output of said rectifying means to said rotating field winding.

3. In a brushless alternating current generator having a rotatable shaft, a main field winding on the shaft, and a stationary armature winding, an exciter for energizing said main field winding comprising a magnetic core on said shaft having circumferentially spaced slots adjacent the periphery thereof, armature windings comprising two polyphase star-connected windings disposed in said slots, said core having circumferentially spaced, axially extending holes extending therethrough and disposed radially inwardly of said slots, a center-tapped interphase transformer interconnecting said polyphase star-connected windings, said interphase transformer having a winding comprising two magnetically coupled parts disposed in said holes, each of said holes containing an equal number of passes from the conductors forming said parts, said magnetic core having magnetic isolation slots extending axially thereof between the windings of said interphase transformer and said polyphase star-connected windings, rectifying means mounted on said shaft for rectifying the output of said star-connected windings, and circuit means connecting the output of said rectifying means to said rotating field winding.

References Cited in the file of this patent

UNITED STATES PATENTS

| Number | Name | Date |
|---|---|---|
| 563,940 | Parcelle | July 14, 1896 |
| 955,171 | Kicklighter | Apr. 19, 1910 |
| 1,052,478 | Goldberg | Feb. 11, 1913 |
| 1,699,153 | Mittag | Jan. 15, 1929 |
| 1,755,859 | Baker | Apr. 22, 1930 |
| 2,414,287 | Creyer | Jan. 14, 1947 |